(12) United States Patent
Onoda et al.

(10) Patent No.: US 12,066,092 B2
(45) Date of Patent: Aug. 20, 2024

(54) POWER TRANSMISSION DEVICE

(71) Applicant: TOYOTA JIDOSHA KABUSHIKI KAISHA, Toyota (JP)

(72) Inventors: Naoto Onoda, Sunto-gun (JP); Yuki Kurosaki, Yamato (JP); Akira Iida, Susono (JP); Kohji Takamatsu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/527,438

(22) Filed: Dec. 4, 2023

(65) Prior Publication Data

US 2024/0240707 A1 Jul. 18, 2024

(30) Foreign Application Priority Data

Jan. 16, 2023 (JP) ................................ 2023-004688

(51) Int. Cl.
| | |
|---|---|
| *F16H 57/028* | (2012.01) |
| *F16H 1/28* | (2006.01) |
| *F16H 57/023* | (2012.01) |
| *F16H 57/02* | (2012.01) |

(52) U.S. Cl.
CPC ............. *F16H 57/028* (2013.01); *F16H 1/28* (2013.01); *F16H 57/023* (2013.01); *F16H 2057/02043* (2013.01)

(58) Field of Classification Search
CPC ........ F16H 57/028; F16H 1/28; F16H 57/023; F16H 2057/02043
See application file for complete search history.

(56) References Cited

U.S. PATENT DOCUMENTS

| | | | | |
|---|---|---|---|---|
| 4,408,746 A | * | 10/1983 | Marsch | B66D 1/22 475/900 |
| 5,643,127 A | * | 7/1997 | Yoshii | F16H 57/0483 184/6.12 |
| 9,878,606 B2 | | 1/2018 | Kobayashi et al. | |
| 2013/0072345 A1 | * | 3/2013 | Kubo | F16H 57/02 475/346 |
| 2015/0260268 A1 | * | 9/2015 | Minaminakamichi | F16H 63/32 475/5 |
| 2021/0114467 A1 | * | 4/2021 | Suyama | B60K 1/00 |

FOREIGN PATENT DOCUMENTS

| | | |
|---|---|---|
| JP | 2014-119071 A | 6/2014 |
| JP | 2017-145899 A | 8/2017 |
| JP | 2019-215035 A | 12/2019 |

* cited by examiner

*Primary Examiner* — Justin Holmes
(74) *Attorney, Agent, or Firm* — Oliff PLC

(57) ABSTRACT

A power transmission device includes: a planetary gear mechanism including a sun gear that is an external tooth gear, a ring gear that is an internal tooth gear located coaxially with the sun gear, a pinion gear that is an external tooth gear and meshes with the sun gear and the ring gear, and a carrier that rotatably supports the pinion gear; a case member that accommodates the planetary gear mechanism; an extending member that extends from an outer peripheral portion of the ring gear toward one side in a thrust direction; and a holding member that is provided at an end of the extending member on a side opposite to the ring gear side in the thrust direction, the holding member being connected to the case member for holding the ring gear.

6 Claims, 7 Drawing Sheets

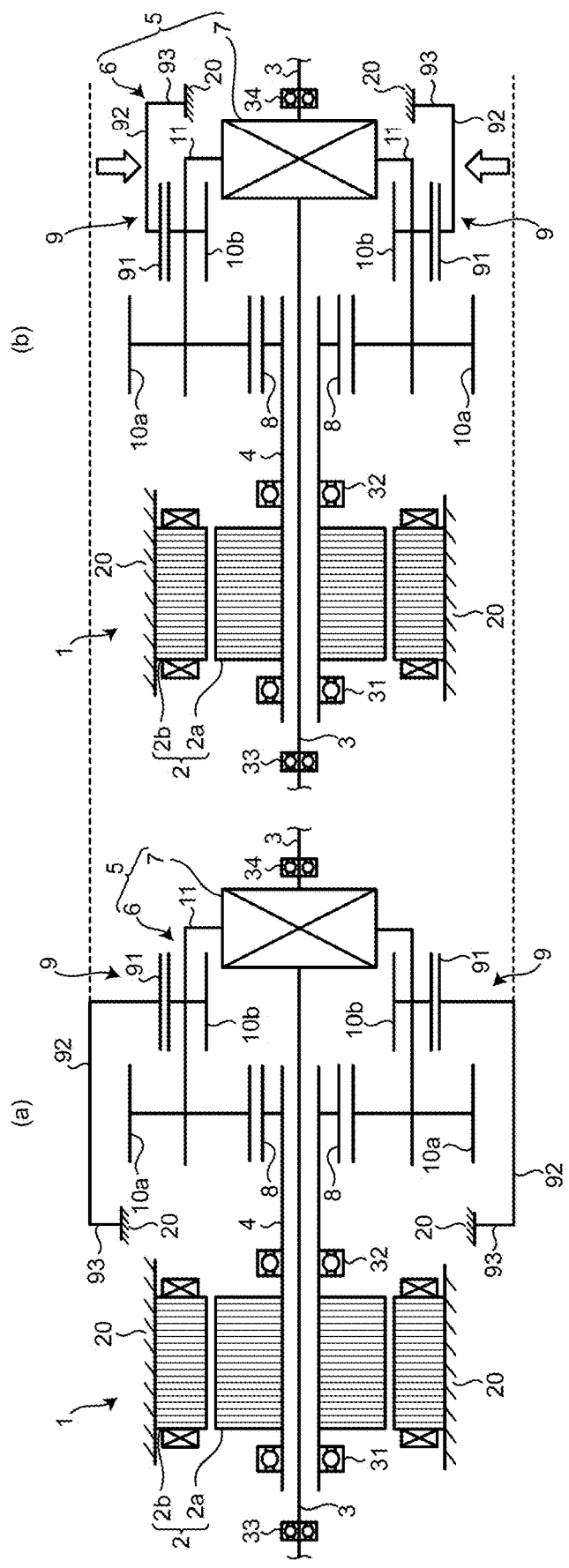

POWER TRANSMISSION DEVICE

CROSS-REFERENCE TO RELATED APPLICATION(S)

The present application claims priority to and incorporates by reference the entire contents of Japanese Patent Application No. 2023-004688 filed in Japan on Jan. 16, 2023.

BACKGROUND

The present disclosure relates to a power transmission device.

Japanese Laid-open Patent Publication No. 2017-145899 discloses a technology of reducing vibration by arranging a thrust bearing between a ring gear and a carrier for canceling out a thrust force acting on the ring gear and a thrust force acting on the carrier from a pinion gear.

SUMMARY

There is a need for providing a power transmission device capable of reducing vibration transmitted from a ring gear to a case member and suppressing noise and vibration.

According to an embodiment, a power transmission device includes: a planetary gear mechanism including a sun gear that is an external tooth gear, a ring gear that is an internal tooth gear located coaxially with the sun gear, a pinion gear that is an external tooth gear and meshes with the sun gear and the ring gear, and a carrier that rotatably supports the pinion gear; a case member that accommodates the planetary gear mechanism; an extending member that extends from an outer peripheral portion of the ring gear toward one side in a thrust direction; and a holding member that is provided at an end of the extending member on a side opposite to the ring gear side in the thrust direction, the holding member being connected to the case member for holding the ring gear.

BRIEF DESCRIPTION OF THE DRAWINGS

FIG. 8 is a skeleton diagram illustrating an example of a power transmission device according to a fourth embodiment in part (a) and illustrating another example of the power transmission device according to the fourth embodiment in part (b).

DETAILED DESCRIPTION

In the technology disclosed in Japanese Laid-open Patent Publication No. 2017-145899, a connection portion between the ring gear and the case is located on an extension line from a gear portion of the ring gear in a radial direction, so that vibration in the radial direction of the ring gear is easily transmitted to the case, and noise and vibration tend to be large.

First Embodiment

A first embodiment of a power transmission device according to the present disclosure is hereinafter described. Note that, the present disclosure is not limited by this embodiment. A vehicle targeted in this embodiment is a vehicle using at least a motor as a driving power source. Therefore, the vehicle may be a battery electric vehicle (BEV) using only a motor as a driving power source, or a hybrid electric vehicle (HEV) using an engine and a motor as a driving power source.

Figure 1:
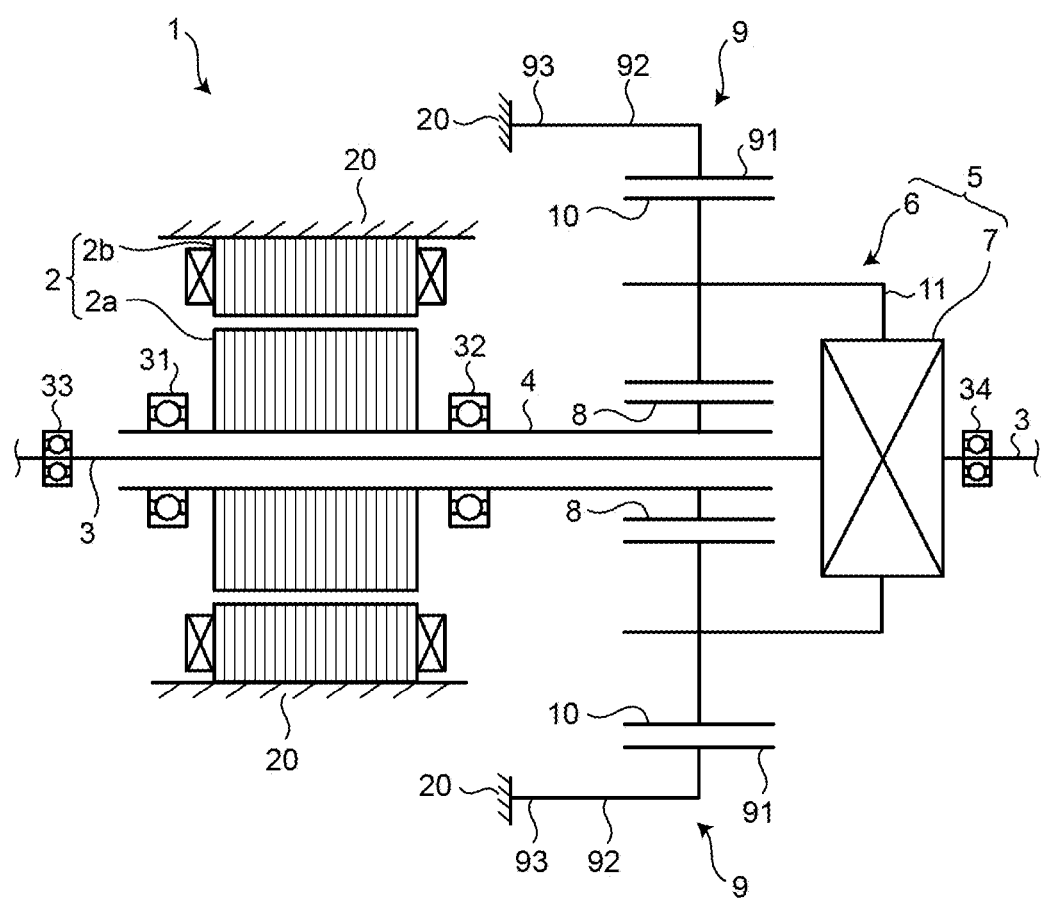
FIG. 1 is a skeleton diagram illustrating an example of a power transmission device mounted on a battery electric vehicle (BEV)

FIG. 1 is a skeleton diagram illustrating an example of a power transmission device 1 according to a first embodiment. The power transmission device 1 according to the first embodiment is provided with a transmission device 5 that transmits power of a motor 2 functioning as a driving power source to a pair of right and left drive wheels not illustrated via a pair of right and left axles 3 rotatably supported by bearing members 33 and 34, respectively.

The motor 2 at least has a function as an electric motor that is supplied with electric power to be driven to output motor torque. In this embodiment, the motor 2 also has a function as a generator that externally receives torque to be driven to generate electric power. That is, the motor 2 is a motor-generator having the function as the electric motor and the function as the generator, and is formed of, for example, a permanent magnet synchronous motor or an induction motor. The motor 2 is provided with a rotor 2a and a stator 2b. The rotor 2a is integrally fixed to a rotor shaft 4 rotatably supported by bearing members 31 and 32. The stator 2b is fixed to a case 20 on an outer peripheral side of the rotor 2a. The case 20 is a case member that accommodates the motor 2 and the transmission device 5 (a deceleration mechanism 6 and a differential device 7). Note that, a battery not illustrated is connected to the motor 2 via an inverter not illustrated.

The transmission device 5 is arranged coaxially with the motor 2, and is mainly formed of the deceleration mechanism 6 and the differential device 7. The deceleration mechanism 6 is formed of a planetary gear mechanism including a sun gear 8, a ring gear 9 located coaxially with the sun gear 8, a plurality of pinion gears 10, and a carrier 11 that holds the plurality of pinion gears 10 so as to be rotatable and revolvable. For example, three pinion gears 10 are provided at regular intervals in a circumferential direction of the ring gear 9 as the plurality of pinion gears 10. Note that, for example, four pinion gears 10 may be provided at regular intervals in the circumferential direction of the ring gear 9 as the plurality of pinion gears 10.

The sun gear 8 is an external tooth gear formed of helical teeth, and is fixed to the rotor shaft 4 so as not to be relatively rotatable. The ring gear 9 is an internal tooth gear formed of helical teeth, and a gear portion 91 is provided on an inner peripheral portion of the ring gear 9. The plurality of pinion gears 10 is external tooth gears formed of helical teeth, and meshes with the sun gear 8 and the gear portion 91 of the ring gear 9. In the power transmission device 1 according to the first embodiment, an annular extending member 92 extending from an outer peripheral portion of the ring gear 9 toward one side in a thrust direction (an axial direction of the ring gear 9) is provided. The power transmission device 1 according to the first embodiment is provided with an annular holding member 93 that is provided at an end of the extending member 92 on a side opposite to the ring gear 9 side in the thrust direction and is connected to the case 20 for holding the ring gear 9. An end of the holding member 93 on a side opposite to the extending member 92 side in the thrust direction is fitted to the case 20. Note that, a plurality of fitting portions between the holding member 93 and the case 20 is provided in a circumferential direction of the holding member 93. In the power transmission device 1 according to the first embodiment, the gear portion 91 of the ring gear 9, the extending member 92, and the holding member 93 are integrally formed. In other words, in the power transmission device 1 according to the first embodiment, the ring gear 9, the extending member 92, and the holding member 93 are integrally formed. Note that, the gear portion 91 of the ring gear 9, the extending member 92, and the holding member 93 are not required to be integrally formed. In the power transmission device 1 according to the first embodiment, the ring gear 9 is held by the case 20 so as not to be relatively rotatable by the holding member 93 via the extending member 92.

The carrier 11 also serves as a part of a differential case in the differential device 7. Therefore, in the deceleration mechanism 6, the sun gear 8 serves as an input member, the ring gear 9 serves as a reaction force member, and the carrier 11 serves as an output member. As a result, the deceleration mechanism 6 decelerates the power transmitted from the motor 2 to output to the differential device 7. The differential device 7 is a differential device that transmits the power transmitted from the motor 2 via the deceleration mechanism 6 to the drive wheels not illustrated while allowing a rotational speed difference between the pair of axles 3, and a known configuration can be adopted, for example.

In the power transmission device 1 according to the first embodiment, the extending member 92 extending from the outer peripheral portion of the ring gear 9 in the thrust direction is provided between the gear portion 91 of the ring gear 9 and the holding member 93 as illustrated in FIG. 1. The holding member 93 is fitted to the case 20 at a position on an outer side of the gear portion 91 of the ring gear 9 in a radial direction and away from the gear portion 91 in the thrust direction. As a result, in a case where the gear portion 91 of the ring gear 9 vibrates in the radial direction (a radial direction of the ring gear 9) during the operation of the deceleration mechanism 6, the vibration is less likely to be transmitted from the gear portion 91 to the case 20 in the radial direction than in a configuration in which the holding member 93 is fitted to the case 20 on an extension line from the gear portion 91 in the radial direction. In the power transmission device 1 according to the first embodiment, in a case where the gear portion 91 vibrates in the radial direction, the vibration in the radial direction can be attenuated by displacement of the extending member 92 in the radial direction to be transmitted to the holding member 93. As a result, it is possible to reduce the vibration in the radial direction transmitted from the holding member 93 to the case 20. Therefore, in the power transmission device 1 according to the first embodiment, it is possible to reduce the vibration transmitted from the ring gear 9 to the case 20 and suppress noise and vibration from increasing.

In the power transmission device 1 according to the first embodiment, the planetary gear mechanism that forms the deceleration mechanism 6 is preferably formed by a combination of the number of teeth of the pinion gear 10 and the number of teeth of the gear portion 91 such that the plurality of pinion gears 10 sequentially meshes with the ring gear 9. For example, a combination of the numbers of teeth that cancels out moments acting on the ring gear 9 from the plurality of pinion gears 10 such as sequential meshing of the three pinion gears 10 and sequential meshing of the four pinion gears 10 is used. Note that, the sequential meshing of the three pinion gears 10 means that the three pinion gears 10 start meshing with the gear portion 91 of the ring gear 9 in order while shifting by ⅓ in a revolution direction. The sequential meshing of the four pinion gears 10 means that the four pinion gears 10 start meshing with the gear portion 91 of the ring gear 9 in order while shifting by ¼ in the revolution direction. The combination of the number of teeth of the pinion gear 10 and the number of teeth of the gear portion 91 such that the plurality of pinion gears 10 sequentially meshes with the ring gear 9 allows the total moment acting on the ring gear 9 to be zero by the plurality of pinion gears 10 and the gear portion 91 meshing with each other. As a result, the combination of the numbers of teeth in which a vibration component other than the vibration component in the radial direction in which a vibration reducing effect by the extending member 92 is easily obtained is unlikely to be generated is obtained, and the vibration reducing effect can be obtained in a wide frequency band.

Second Embodiment

A second embodiment of a power transmission device according to the present disclosure is hereinafter described. Note that, description of contents common to those of the first embodiment will be omitted as appropriate in the second embodiment.

Figure 2:
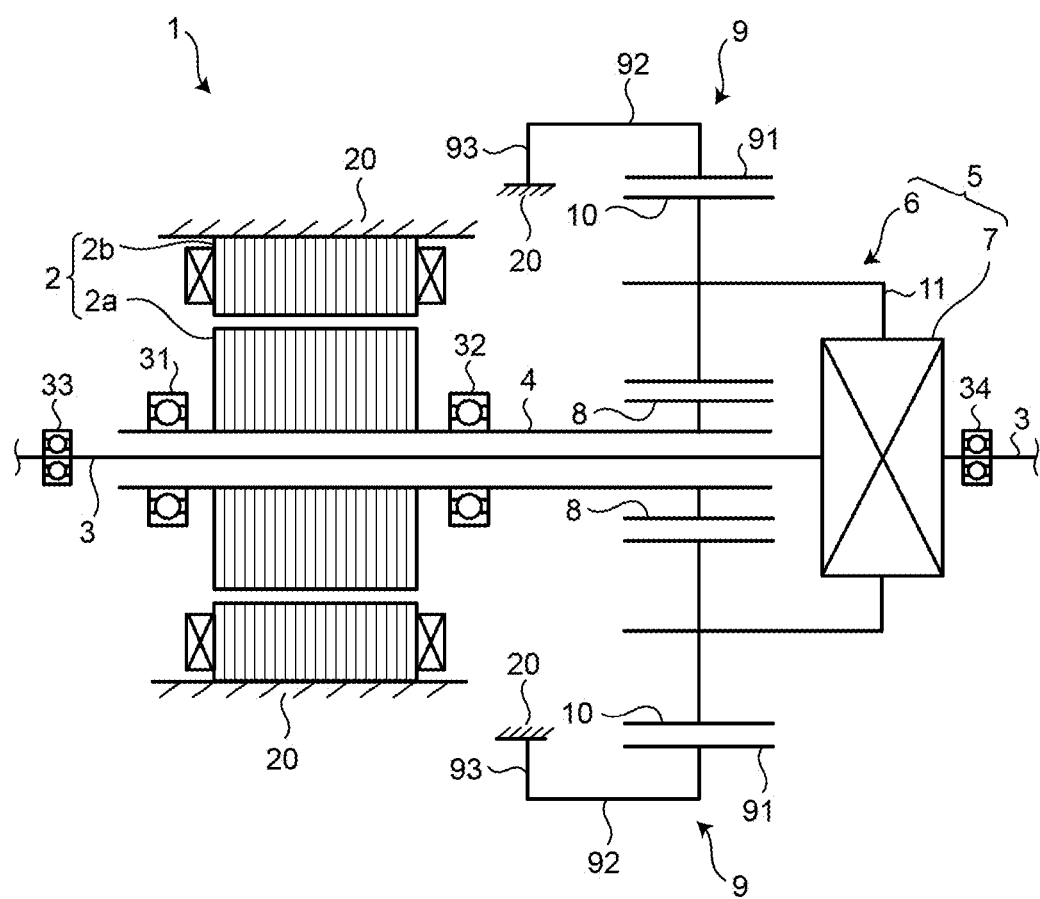
FIG. 2 is a skeleton diagram illustrating an example of a power transmission device according to a second embodiment.
Figure 3:
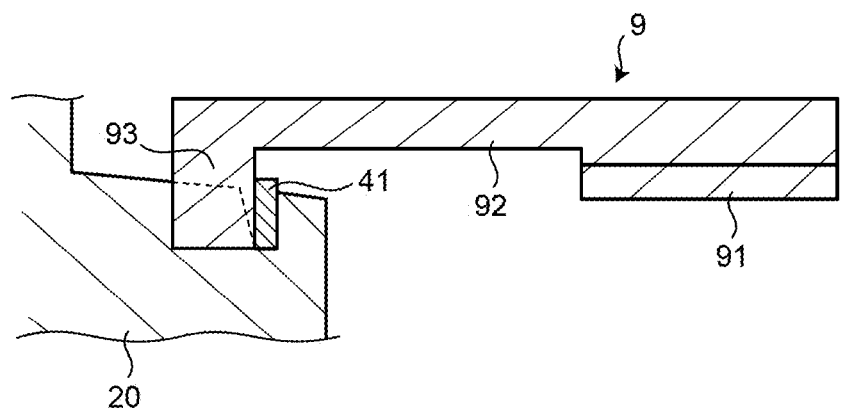
FIG. 3 is a cross-sectional view illustrating a case where a gear portion, an extending member, and a holding member are integrally formed.

FIG. 2 is a skeleton diagram illustrating an example of a power transmission device 1 according to a second embodiment. FIG. 3 is a cross-sectional view illustrating a case where a gear portion 91, an extending member 92, and a holding member 93 are integrally formed.

In the power transmission device 1 according to the second embodiment, the extending member 92 extending from an outer peripheral portion of a ring gear 9 in a thrust direction is provided between the gear portion 91 of the ring gear 9 and the holding member 93 as illustrated in FIGS. 2 and 3. The extending member 92 and the holding member 93 have an annular shape, and an inner peripheral portion of the holding member 93 is held by a case 20. Note that, the holding member 93 is preferably held by the case 20 on an inner diameter side than the gear portion 91 of the ring gear 9. In the power transmission device 1 according to the second embodiment, the gear portion 91 of the ring gear 9, the extending member 92, and the holding member 93 are integrally formed as illustrated in FIG. 3. The holding member 93 and the case 20 are fixed by a fixing member 41.

In the power transmission device 1 according to the second embodiment, the extending member 92 extending from the outer peripheral portion of the ring gear 9 in the thrust direction is provided between the gear portion 91 of the ring gear 9 and the holding member 93. The holding member 93 is fitted to the case 20 at a position away from the gear portion 91 in the thrust direction. As a result, in a case where the gear portion 91 of the ring gear 9 vibrates in a radial direction during the operation of a deceleration mechanism 6, the vibration is less likely to be transmitted from the gear portion 91 to the case 20 in the radial direction than in a configuration in which the holding member 93 is fitted to the case 20 on an extension line from the gear portion 91 in the radial direction. In the power transmission device 1 according to the second embodiment, in a case where the gear portion 91 vibrates in the radial direction, the vibration in the radial direction can be attenuated by displacement of the extending member 92 in the radial direction to be transmitted to the holding member 93. As a result, it is possible to reduce the vibration in the radial direction transmitted from the holding member 93 to the case 20. Therefore, in the power transmission device 1 according to the second embodiment, it is possible to reduce the vibration transmitted from the ring gear 9 to the case 20 and suppress noise and vibration from increasing.

In the power transmission device 1 according to the second embodiment, as illustrated in FIG. 3, a thickness of the holding member 93 in a radial direction is made larger than a thickness of the extending member 92 in a radial direction. As a result, it is possible to increase rigidity of the holding member 93 in the radial direction as compared with a case where the thickness of the holding member 93 in the radial direction is the same as the thickness of the extending member 92 in the radial direction. Therefore, in the power transmission device 1 according to the second embodiment, the displacement due to the vibration of the holding member 93 in the radial direction can be suppressed with respect to the displacement due to the vibration of the gear portion 91 and the extending member 92 in the radial direction.

Figure 4:
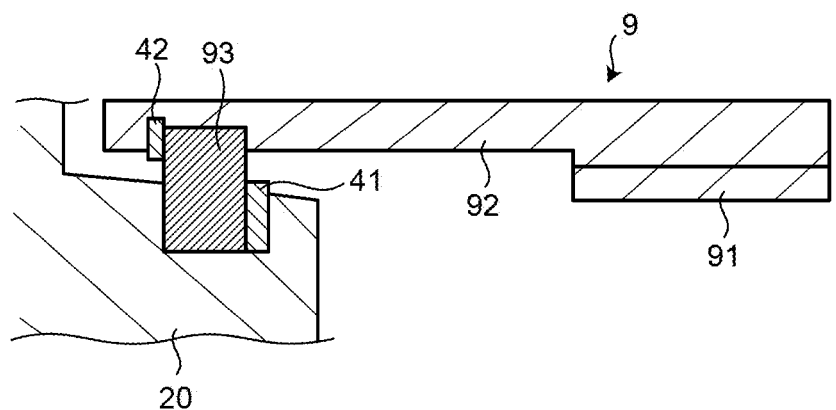
FIG. 4 is a cross-sectional view illustrating a case where the gear portion and the extending member are integrally formed and the holding member is separately formed.
Figure 5:
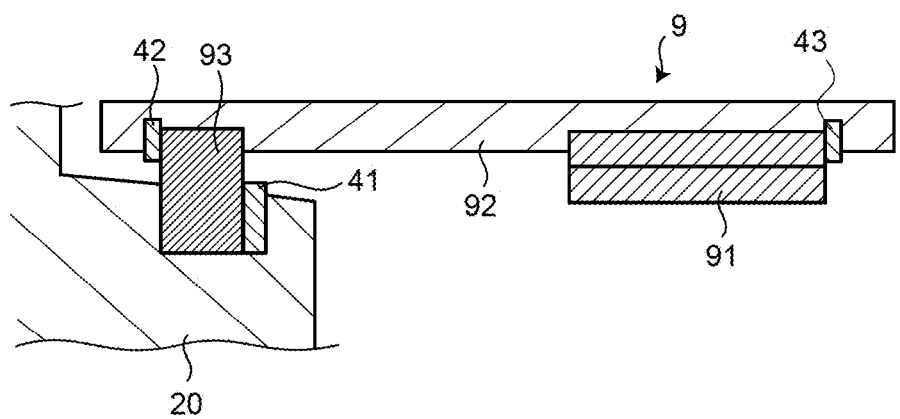
FIG. 5 is a cross-sectional view illustrating a case where the gear portion, the extending member, and the holding member are separately formed.

Note that, in the power transmission device 1 according to the second embodiment, the gear portion 91 of the ring gear 9, the extending member 92, and the holding member 93 are not required to be integrally formed. That is, in the power transmission device 1 according to the second embodiment, it is possible that the gear portion 91 of the ring gear 9 and the extending member 92 are integrally formed, and the holding member 93 is separately formed as illustrated in FIG. 4, for example. The extending member 92 and the holding member 93 are fixed by a fixing member 42, and the holding member 93 and the case 20 are fixed by a fixing member 41. In the power transmission device 1 according to the first embodiment, the gear portion 91 of the ring gear 9, the extending member 92, and the holding member 93 may be separately formed as illustrated in FIG. 5, for example. The gear portion 91 of the ring gear 9 and the extending member 92 are fixed by a fixing member 43, the extending member 92 and the holding member 93 are fixed by the fixing member 42, and the holding member 93 and the case 20 are fixed by the fixing member 41.

In the power transmission device 1 according to the second embodiment, a planetary gear mechanism that forms the deceleration mechanism 6 is preferably formed by a combination of the number of teeth of the pinion gear 10 and the number of teeth of the gear portion 91 such that the plurality of pinion gears 10 sequentially meshes with the ring gear 9.

Figure 6:
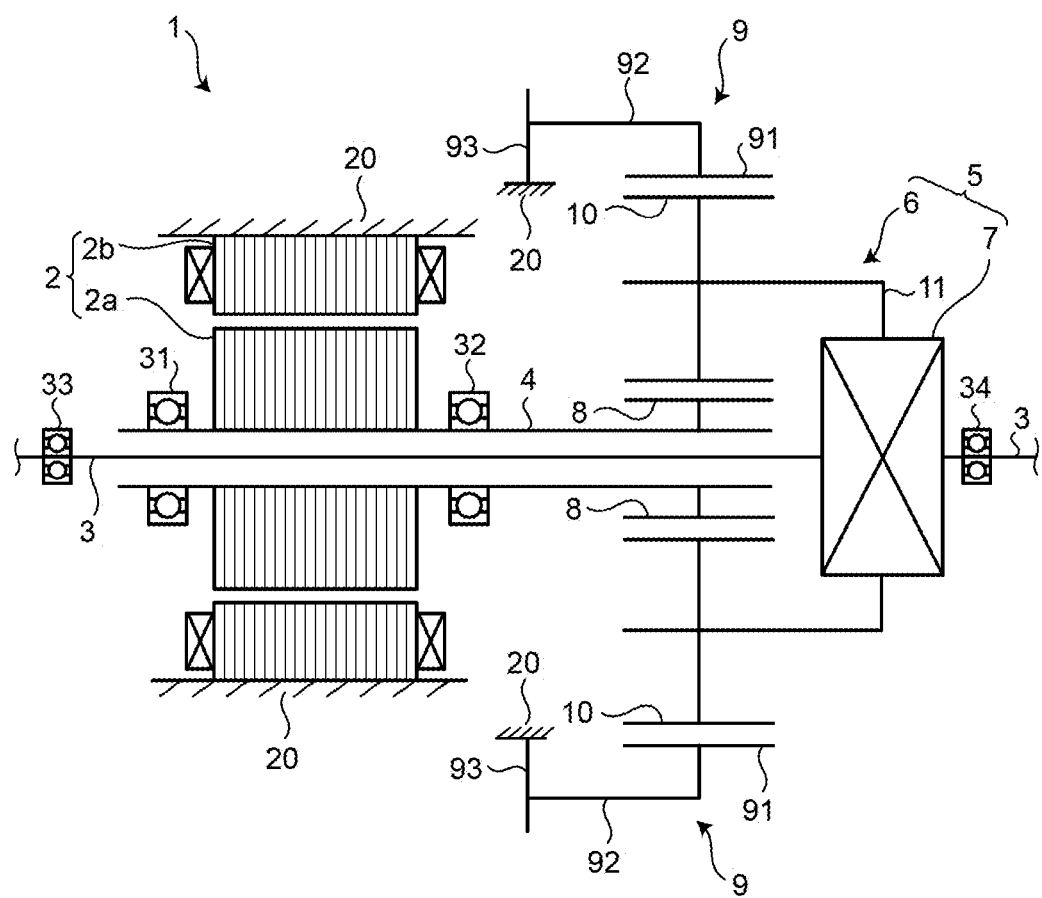
FIG. 6 is a skeleton diagram illustrating another example of the power transmission device according to the second embodiment.

FIG. 6 is a skeleton diagram illustrating another example of the power transmission device according to the second embodiment. In the power transmission device 1 according to the second embodiment, as illustrated in FIG. 6, the holding member 93 may be provided to be extended outward in the radial direction from a connection portion with the extending member 92. As a result, it is possible to make the thickness of the holding member 93 in the radial direction further larger than the thickness of the extending member 92, and further increase rigidity of the holding member 93 in the radial direction. Therefore, the displacement due to the vibration of the holding member 93 in the radial direction can be further suppressed with respect to the displacement due to the vibration of the gear portion 91 and the extending member 92 in the radial direction.

Third Embodiment

A third embodiment of a power transmission device according to the present disclosure is hereinafter described. Note that, description of contents common to those of the second embodiment will be omitted as appropriate in the third embodiment.

Figure 7:
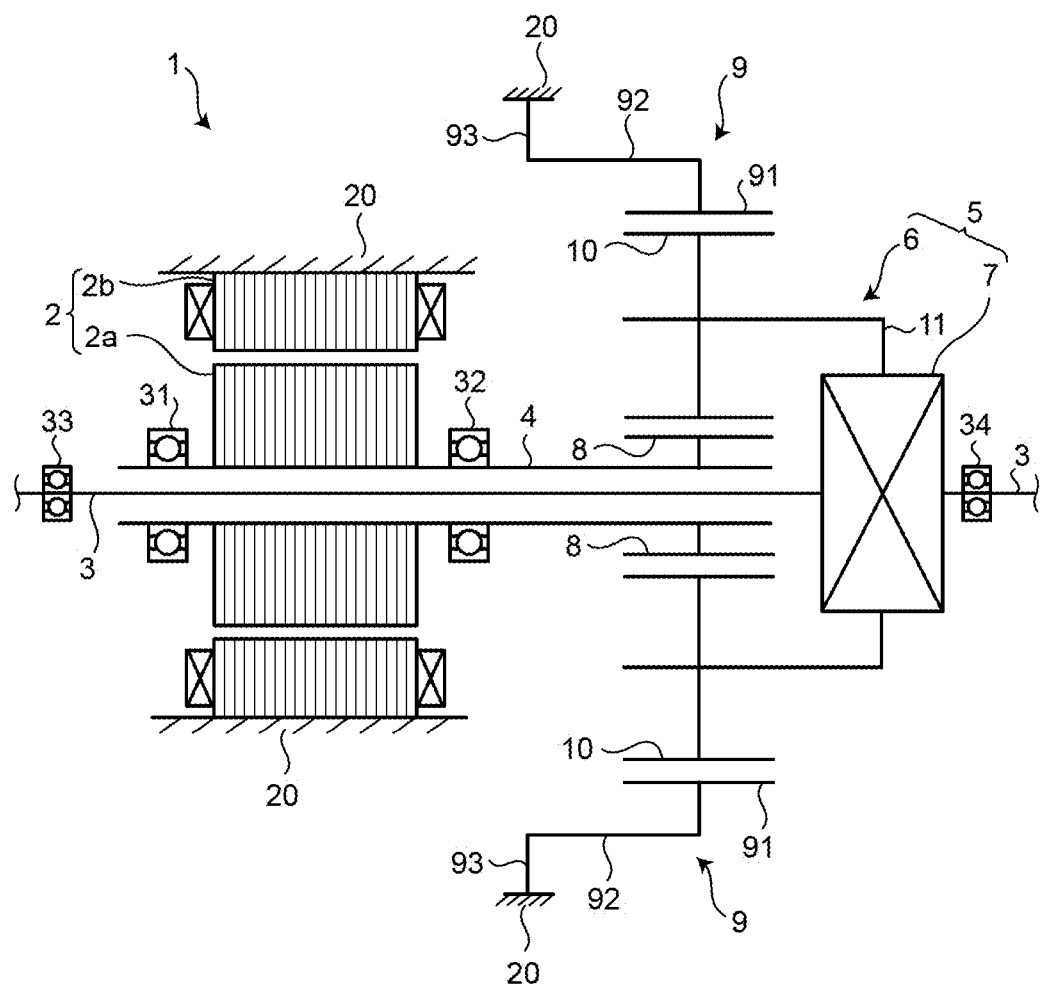
FIG. 7 is a skeleton diagram illustrating an example of a power transmission device according to a third embodiment.

FIG. 7 is a skeleton diagram illustrating an example of the power transmission device according to the third embodiment. In a power transmission device 1 according to the third embodiment, an extending member 92 extending from an outer peripheral portion of a ring gear 9 in a thrust direction is provided between a gear portion 91 of the ring gear 9 and a holding member 93 as illustrated in FIG. 7. The extending member 92 and the holding member 93 have an annular shape, and an outer peripheral portion of the holding member 93 is held by a case 20. In the power transmission device 1 according to the third embodiment, a thickness of the holding member 93 in a radial direction is preferably made larger than a thickness of the extending member 92 in a radial direction.

In the power transmission device 1 according to the third embodiment, a combination of the numbers of teeth that cancels out the total moment of the plurality of pinion gears 10 such as sequential meshing of the three pinion gears 10 and sequential meshing of the four pinion gears 10 in the deceleration mechanism 6 is preferable.

In the power transmission device 1 according to the third embodiment, the extending member 92 extending from the outer peripheral portion of the ring gear 9 in the thrust direction is provided between the gear portion 91 of the ring gear 9 and the holding member 93 as illustrated in FIG. 7. The holding member 93 is fitted to the case 20 at a position on an outer side of the gear portion 91 of the ring gear 9 in a radial direction and away from the gear portion 91 in the thrust direction. As a result, in a case where the gear portion 91 of the ring gear 9 vibrates in a radial direction during the operation of a deceleration mechanism 6, the vibration is less likely to be transmitted from the gear portion 91 to the case 20 in the radial direction than in a configuration in which the holding member 93 is fitted to the case 20 on an extension line from the gear portion 91 in the radial direction. In the power transmission device 1 according to the third embodiment, in a case where the gear portion 91 vibrates in the radial direction, the vibration in the radial direction can be attenuated by displacement of the extending member 92 in the radial direction to be transmitted to the holding member 93. As a result, it is possible to reduce the vibration in the radial direction transmitted from the holding member 93 to the case 20. Therefore, in the power transmission device 1 according to the third embodiment, it is possible to reduce the vibration transmitted from the ring gear 9 to the case 20 and suppress noise and vibration from increasing.

Fourth Embodiment

A fourth embodiment of a power transmission device according to the present disclosure is hereinafter described.

Note that, description of contents common to those of the first embodiment will be omitted as appropriate in the fourth embodiment.

Part (a) of FIG. 8 is a skeleton diagram illustrating an example of a power transmission device 1 according to the fourth embodiment. Part (b) of FIG. 8 is a skeleton diagram illustrating another example of the power transmission device 1 according to the fourth embodiment. In a deceleration mechanism 6 included in the power transmission device 1 according to the fourth embodiment, a pinion gear 10 is formed of a stepped pinion including a large-diameter portion 10a and a small-diameter portion 10b. Note that, in this embodiment, three pinion gears 10 are provided at regular intervals in a circumferential direction. The large-diameter portion 10a of the pinion gear 10 meshes with a sun gear 8. The small-diameter portion 10b of the pinion gear 10 meshes with a gear portion 91 of a ring gear 9. The large-diameter portion 10a of the pinion gear 10 revolves with a tooth tip diameter larger than that of the small-diameter portion 10b.

In the power transmission device 1 illustrated in part (a) of FIG. 8, the extending member 92 is extended from the gear portion 91 of the ring gear 9 toward the large-diameter portion 10a side of the pinion gear 10 in the thrust direction through an outer side of the large-diameter portion 10a of the pinion gear 10 in the radial direction. The inner peripheral portion of the holding member 93 is fitted to the case 20 at a position away from the gear portion 91 in the thrust direction by the extending member 92.

In the power transmission device 1 illustrated in part (b) of FIG. 8, the extending member 92 is extended from the gear portion 91 of the ring gear 9 toward a side opposite to the large-diameter portion 10a of the pinion gear 10 in a thrust direction. The inner peripheral portion of the holding member 93 is fitted to the case 20 at a position away from the gear portion 91 in the thrust direction by the extending member 92.

In the power transmission device 1 according to the fourth embodiment, a thickness of the holding member 93 in a radial direction is preferably made larger than a thickness of the extending member 92 in a radial direction.

In the power transmission device 1 according to the fourth embodiment, the extending member 92 extending from an outer peripheral portion of the ring gear 9 in the thrust direction is provided between the gear portion 91 of the ring gear 9 and the holding member 93 as illustrated in part (a) and part (b) of FIG. 8. The holding member 93 is fitted to the case 20 at a position away from the gear portion 91 in the thrust direction. As a result, in a case where the gear portion 91 of the ring gear 9 vibrates in a radial direction during the operation of a deceleration mechanism 6, the vibration is less likely to be transmitted from the gear portion 91 to the case 20 in the radial direction than in a configuration in which the holding member 93 is fitted to the case 20 on an extension line from the gear portion 91 in the radial direction. In the power transmission device 1 according to the third embodiment, in a case where the gear portion 91 vibrates in the radial direction, the vibration in the radial direction can be attenuated by displacement of the extending member 92 in the radial direction to be transmitted to the holding member 93. As a result, it is possible to reduce the vibration in the radial direction transmitted from the holding member 93 to the case 20. Therefore, in the power transmission device 1 according to the fourth embodiment, it is possible to reduce the vibration transmitted from the ring gear 9 to the case 20 and suppress noise and vibration from increasing.

In the power transmission device 1 according to the fourth embodiment, as illustrated in part (b) of FIG. 8, it is preferable to adopt a configuration in which the extending member 92 is extended from the gear portion 91 of the ring gear 9 toward the side opposite to the large-diameter portion 10a side of the pinion gear 10 in the thrust direction. As a result, a size of the power transmission device 1 in the radial direction can be reduced as compared with the configuration in which the extending member 92 is extended from the gear portion 91 to the large-diameter portion 10a of the pinion gear 10 in the thrust direction as illustrated in part (a) of FIG. 8.

In the power transmission device 1 according to the fourth embodiment, a planetary gear mechanism that forms the deceleration mechanism 6 is preferably formed by a combination of the number of teeth of the small-diameter portion 10b and the number of teeth of the gear portion 91 such that the small-diameter portion 10b of the plurality of pinion gears 10 sequentially meshes with the ring gear 9.

The power transmission device according to the present disclosure has an effect of reducing vibration transmitted from a ring gear to a case member and suppressing noise and vibration.

According to an embodiment, the power transmission device according to the present disclosure can reduce vibration transmitted from the ring gear to the case member and suppress noise and vibration.

According to an embodiment, it possible to further reduce the vibration in the radial direction transmitted from the ring gear to the case member.

According to an embodiment, rigidity of the holding member is increased, and the vibration in the radial direction can be suppressed.

According to an embodiment, a combination of the numbers of teeth in which a vibration component other than a radial vibration component in which a vibration reducing effect by the extending member is easily obtained is unlikely to be generated is obtained, and the vibration reducing effect can be obtained in a wide frequency band.

According to an embodiment, it possible to reduce a size of the power transmission device.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission device comprising:
   a planetary gear mechanism including
   a sun gear that is an external tooth gear,
   a ring gear that is an internal tooth gear located coaxially with the sun gear,
   a pinion gear that is an external tooth gear and meshes with the sun gear and the ring gear, and
   a carrier that rotatably supports the pinion gear;
   a case member that accommodates the planetary gear mechanism;
   an extending member that extends from an outer peripheral portion of the ring gear toward one side in a thrust direction; and
   a holding member that is provided at an end of the extending member on a side opposite to the ring gear side in the thrust direction, the holding member being connected to the case member for holding the ring gear, wherein the pinion gear is a stepped pinion including a large-diameter portion that meshes with the sun gear and a small-diameter portion that has a diameter smaller than a diameter of the large-diameter portion and meshes with the ring gear, and the extending member is extended toward a side opposite to the large-diameter portion side in the thrust direction.

2. The power transmission device according to claim 1, wherein each of the extending member and the holding member has an annular shape, and an inner peripheral portion of the holding member is held by the case member.

3. The power transmission device according to claim 1, wherein each of the extending member and the holding member has an annular shape, and a thickness of the holding member in a radial direction is larger than a thickness of the extending member in a radial direction.

4. The power transmission device according to claim 2, wherein a thickness of the holding member in a radial direction is larger than a thickness of the extending member in a radial direction.

5. A power transmission device comprising:

a planetary gear mechanism including
  a sun gear that is an external tooth gear,
  a ring gear that is an internal tooth gear located coaxially with the sun gear,
  a pinion gear that is an external tooth gear and meshes with the sun gear and the ring gear, and
  a carrier that rotatably supports the pinion gear;

a case member that accommodates the planetary gear mechanism;

an extending member that extends from an outer peripheral portion of the ring gear toward one side in a thrust direction; and a holding member that is provided at an end of the extending member on a side opposite to the ring gear side in the thrust direction, the holding member being connected to the case member for holding the ring gear, wherein each of the extending member and the holding member has an annular shape, an inner peripheral portion of the holding member is held by the case member, and a thickness of the holding member in a radial direction is larger than a thickness of the extending member in a radial direction.

6. A power transmission device comprising:

a planetary gear mechanism including
  a sun gear that is an external tooth gear,
  a ring gear that is an internal tooth gear located coaxially with the sun gear,
  a pinion gear that is an external tooth gear and meshes with the sun gear and the ring gear, and
  a carrier that rotatably supports the pinion gear;

a case member that accommodates the planetary gear mechanism;

an extending member that extends from an outer peripheral portion of the ring gear toward one side in a thrust direction; and a holding member that is provided at an end of the extending member on a side opposite to the ring gear side in the thrust direction, the holding member being connected to the case member for holding the ring gear, wherein the planetary gear mechanism is formed by a combination of a number of teeth of the pinion gear and a number of teeth of the ring gear such that a plurality of the pinion gears sequentially meshes with the ring gear, the pinion gear is a stepped pinion including a large-diameter portion that meshes with the sun gear and a small-diameter portion that has a diameter smaller than a diameter of the large-diameter portion and meshes with the ring gear, and the extending member is extended toward a side opposite to the large-diameter portion side in the thrust direction.

* * * * *